No. 865,103. PATENTED SEPT. 3, 1907.
J. A. JACKSON & J. H. DOWER.
DEEP WELL DRILLING APPARATUS.
APPLICATION FILED FEB. 15, 1907.
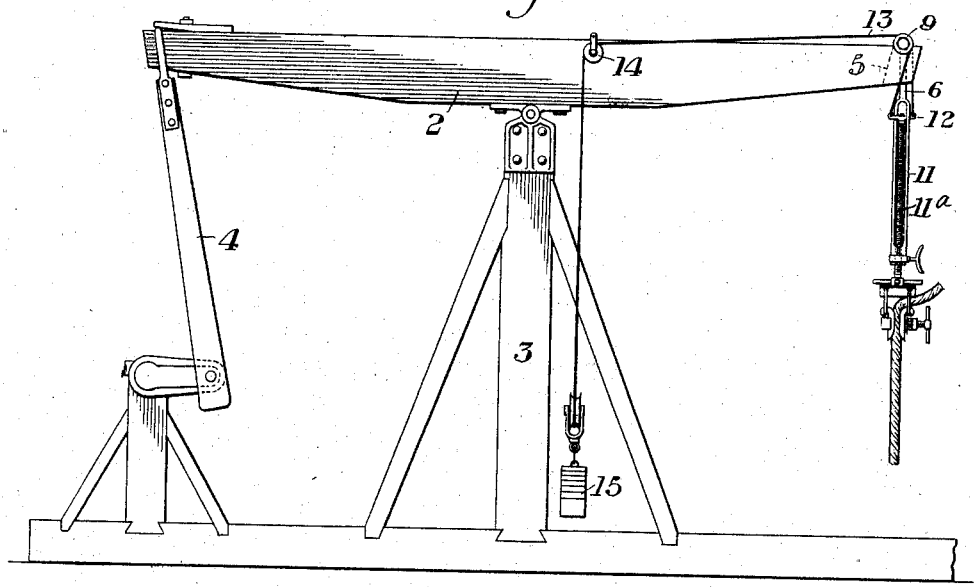
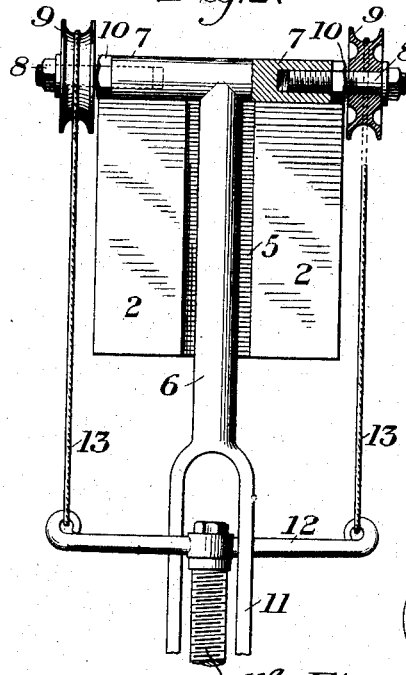
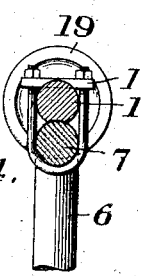
WITNESSES
INVENTORS

UNITED STATES PATENT OFFICE.

JAMES A. JACKSON AND JOHN H. DOWER, OF BRUIN, PENNSYLVANIA.

DEEP-WELL-DRILLING APPARATUS.

No. 865,103.        Specification of Letters Patent.        Patented Sept. 3, 1907.

Application filed February 15, 1907. Serial No. 357,477.

*To all whom it may concern:*

Be it known that we, JAMES A. JACKSON and JOHN H. DOWER, both of Bruin, Butler county, Pennsylvania, have invented a new and useful Deep-Well-Drilling Apparatus, of which the following is a full, clear, and exact description, reference being had to the accompanying drawings, forming part of this specification, in which—

Figure 1 is a side elevation of a drilling rig provided with our invention; Fig. 2 is a sectional detail view on a larger scale; and Fig. 3 is a view similar to Fig. 2 showing a modified form, and Fig. 4 is a detail of Fig. 3.

Our invention relates to drilling apparatus for deep wells, and is designed to provide an improved arrangement of pulleys or wheels for the temper screw, which may be easily and cheaply applied to the ordinary form of temper screw, and will prevent the screw from jumping or leaving its proper position on the walking beam, especially when beginning the drilling operations with the temper screw.

In the drawings, referring to the form of Figs. 1 and 2, 2 represents the walking beam which is rocked in the ordinary manner on the samson post 3 by the connecting rod 4. At the opposite end of the walking beam it is transversely grooved across its top and provided with a vertical slot 5, which receives the stem 6 of the tee head of the temper screw. The arms 7, 7 of the tee head lie in the transverse recess of the walking beam, and are provided with end holes which are internally screw-threaded to receive the screw-bolts 8. The pulleys or wheels 9 are mounted on these screw-bolts, and to provide for varying the distance between the pulleys on account of tee heads of different lengths and walking beams of different widths, we preferably provide jam nuts 10 which screw on the bolts.

The temper screw is of the ordinary type universally used, in which the stem 6 is forked to form the reins 11 which inclose the main screw, or screw proper, 11$^a$ having at its top the cross-bar 12. The two ends of the rope or chain 13 are secured to the ends of this cross-bar and extend up and over the pulleys 9, and thence over pulleys 14 mounted on the sides of the walking beams near its fulcrum.

The loop or bight portion of the rope or chain extends under a pulley supporting the weight 15, so that the weight is equalized on both parts of the chain or rope.

In the operation of the device, when the spudding is completed, and the operation of drilling with the temper screw begins, the rapid reciprocation of the walking beam will not cause the temper screw to jump out of position; since the counterweight acts to hold down the temper screw in its proper position, and the same holding down action occurs throughout the use of the temper screw. The weight is adjusted to hoist the screw instead of lifting by hand.

With the form just described, the head of the temper screw must be tapped, and it is not convenient to do this with old temper screws which are in the field. We have, therefore, devised a modified form which may be quickly and easily attached to old temper screws. Thus, in Figs. 3 and 4, we show a supplemental bar 16 which is preferably longitudinally grooved on its lower side to fit on the tee head of the temper screw and may be fastened thereto by clips 17. This supplemental bar is tapped in its ends and provided with the bolts 18 and pulleys 19 the same as the tee head of the first form. In this form, after the device has been attached to the old temper screw, the operation is the same as described in that of the first form.

The advantages of our invention result from the fact that the ordinary tee head temper screw can be quickly and cheaply changed to our form; and when so changed the liability of jumping or getting out of place is obviated on account of the counterweight exerting pressure on the tee head of the screw. The labor and delay of hand-hoisting is avoided. When unloosening the temper screw clamps that are clamped to the drilling cable, as deeper drilling progresses, the clamps are relieved at once from the cable, by the counterweight exerting pressure on the tee head of the temper screw, thereby holding the temper screw down to its proper position.

Either pulleys or wheels may be used, and these may be attached to the tee head or an attachment thereon in any convenient manner, without departing from our invention.

We claim:—

1. In deep well drilling apparatus, a temper screw having a cross bar, a tee head having wheels or pulleys mounted at its opposite ends, flexible connections extending from the cross bar of the screw over the wheels or pulleys, and a counterweight attached to said connections; substantially as described.

2. In deep well drilling apparatus, a temper screw having a tee head, and wheels or pulleys mounted upon the opposite ends of said head; substantially as described.

3. In a deep drilling apparatus a tee head temper screw having pins inserted in the ends of the tee head and pulleys or wheels mounted on said pins; substantially as described.

4. In deep well drilling apparatus, a temper screw having a head, a tee-head mounted on the walking beam over the screw, wheels or pulleys on said tee, and counterweighted flexible connections from the head of the screw passing over said wheels or pulleys; substantially as described.

5. In deep well drilling apparatus, a temper screw having a cross head, a tee-head having reins embracing the screw, wheels or pulleys journaled on the tee head, flexible connections extending from the cross head of the screw over said wheels or pulleys, and a counterweight connected to the flexible connections; substantially as described.

In testimony whereof, we have hereunto set our hand.

JAMES A. JACKSON.
JOHN H. DOWER.

Witnesses:
ALEX MITCHELL,
A. J. EDMONDS.